US012144348B2

(12) United States Patent
Bromberg et al.

(10) Patent No.: US 12,144,348 B2
(45) Date of Patent: Nov. 19, 2024

(54) ANTIVIRAL COMPOSITIONS AND RELATED METHODS

(71) Applicant: Massachusetts Institute of Technology, Cambridge, MA (US)

(72) Inventors: Lev E. Bromberg, Salem, MA (US); T. Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 579 days.

(21) Appl. No.: 17/494,509

(22) Filed: Oct. 5, 2021

(65) Prior Publication Data

US 2022/0104488 A1 Apr. 7, 2022

Related U.S. Application Data

(60) Provisional application No. 63/088,315, filed on Oct. 6, 2020.

(51) Int. Cl.
*C08F 226/06* (2006.01)
*A01N 43/50* (2006.01)
*A01P 1/00* (2006.01)

(52) U.S. Cl.
CPC ................ *A01N 43/50* (2013.01); *A01P 1/00* (2021.08); *C08F 226/06* (2013.01)

(58) Field of Classification Search
None
See application file for complete search history.

(56) References Cited

U.S. PATENT DOCUMENTS 5,269,862 A * 12/1993 Nakajima ................ A43B 1/00 156/193

FOREIGN PATENT DOCUMENTS

GB 1227410 A * 4/1971 ............ C08F 220/44

OTHER PUBLICATIONS

Maurel, M. et al., "Studies of nucleic acid-like polymers as catalysts". Journal of Molecular Evolution 1992, 35(3), 190-195. (Year: 1992).*

* cited by examiner

*Primary Examiner* — Richard A. Huhn
(74) *Attorney, Agent, or Firm* — Foley Hoag LLP; Dana M. Gordon; Alexander J. Chatterley

(57) ABSTRACT

Polyamines are water-soluble polyelectrolytes with the amino groups that can be used to attach the polymers onto functional surfaces of fibrous materials. In addition, polyamines can be readily modified by (super)nucleophilic groups such as (alkyl)aminopyridines that enhance the polymer's ability to promote hydrolysis of organophosphorous chemical warfare agents. Furthermore, attachment of hydantoin moieties augments the number of the imide, amide, or amine groups on the polyamine's chain, which provides oxidizing properties to the resulting modified polyamine after halogenation. In one aspect, disclosed herein are polyamines with side chains modified to contain both (4-aminopyridine, APy) and 5-(4-hydroxybenzylidene) hydantoin (HBH) functionalities with enhanced content of the active bromine. Viricidal activity of the APy- and HBH-modified polyallylamine against human coronavirus (type 229E) was tested both in solution and on nylon-cotton fabric. The polymers are effective at inactivating the coronavirus, at both low concentrations and short exposure times.

20 Claims, 2 Drawing Sheets

ANTIVIRAL COMPOSITIONS AND RELATED METHODS

RELATED APPLICATIONS

This application claims the benefit of priority to U.S. Provisional Patent Application No. 63/088,315, filed on Oct. 6, 2020.

BACKGROUND

Viral infections continue to represent a significant threat to humanity. For example, coronavirus disease (COVID-19) is an infectious disease that has resulted in at least 4.5 million deaths worldwide. In addition to the death toll, to limit the spread of the virus multiple countries have been forced to adopt social distancing policies, which have resulted in severe economic damage. However, despite the significant issues posed by viral infections, there are few methods for treating and preventing them. Accordingly, there is an ongoing need for new methods of treating viral infections.

SUMMARY OF THE INVENTION

In one aspect, the present disclosure provides a copolymer, comprising a plurality of monomers represented by formula I and formula II or salts thereof:

wherein
$R^1$, $R^2$, and $R^3$ are each independently hydrogen, alkyl, or halo;
$A^1$ is aryl or heteroaryl; and
$m^1$, $m^2$, $m^3$, or $m^4$ are each independently an integer selected from 1-20.

In another aspect, the present disclosure provides method of inactivating a pathogen, comprising contacting the pathogen with a copolymer disclosed herein.

In another aspect, the present disclosure provides fabrics, comprising a copolymer disclosed herein.

In another aspect, the present disclosure provides devices, comprising a copolymer disclosed herein.

In another aspect, the present disclosure provides articles of clothing, comprising a copolymer disclosed herein.

In another aspect, the present disclosure provides compositions, comprising a copolymer disclosed herein; and an excipient.

DETAILED DESCRIPTION OF THE INVENTION

For years, the inventors have studied self-decontaminating materials for defense against chemical and biological threats. Reactive materials capable of degrading chemical threats such as chemical warfare agents (CWAs), hazardous industrial chemicals and pesticides include polymeric coatings, metal/metal oxide particles, heterogeneous catalysts and electrocatalysts, metal-organic frameworks, polyoxometalates, N-halamines, light activated compounds and liquid formulations containing peroxides and various nucleophiles. The advantages of polymeric decontaminants include the ease of polymer incorporation into engineered surfaces via conventional techniques such as solution impregnation, painting, covalent grafting and crosslinking as well as stability of the resulting material and lack of polymer leaching. The inventors have developed efficient polymeric reactive decontaminants that sorb water and react with neurotoxic and mustard CWAs and their simulants to yield less toxic products. High contents of very reactive and nucleophilic groups, such as amidoximate, oximate, dialkylaminopyridine, bromosuccinimide, hydantoin, enable both the decontamination capability as well as polymer binding with the protective clothing layers, membranes and other engineered materials where these polymers are intended for application. The inventors developed a family of polymers wherein water-soluble polyamines are modified with highly nucleophilic alkylaminopyridine and oximate groups, significantly augmenting the polyamines' ability to catalyze hydrolysis of CWA, yet the presence of the primary amino groups maintains the capability of facile covalent attachment to functional fibrous surfaces. Bromination of nucleophilic polyamines and maleimides yields polymers capable of decomposing hydrazines and dehydrochlorination of mustard agents, both in vapor and aqueous phases.

The extraordinary shock to the worldwide socioeconomic system due to the ongoing COVID-19 pandemic, caused by the betacoronavirus SARS-CoV-19, along with the outbreaks of SARS (Severe Acute Respiratory Syndrome) and MERS (Middle East Respiratory Syndrome), as well as the Ebola virus, avian and other zoonotic influenza, hoof-and-mouth disease and other epidemic virus-induced diseases, call for rapid deployment of effective disinfectants that enable containment of the disease and eliminate the pathogen on any surface where the airborne respiratory or other droplets might have been deposited, including personal protective equipment (PPE). Antimicrobial polymers are especially suitable constituents of the coatings due to their design variability, augmented biocidal activity, and efficiency relative to their low-MW counterparts, as well as their reduced residual toxicity and extended stability.

Covalent, permanent attachment of the antimicrobial polymers helps to allay concerns about polymer leaching into the human body or the environment. On the other hand, "painting", i.e., simple deposition of an aqueous or solvent antimicrobial agent composition by spraying, brushing, or rolling is simple, cost-effective and can be performed anywhere.

Oxidative, and thus, antibacterial and viricidal action of N-halamines has been reported, and the antibacterial action of brominated N-halamines attached to fibrous materials has been studied, but the capability of this class of materials to inactivate human coronaviruses has thus far remained unproven. Herein, the inventors disclose water-soluble polyamines specifically designed with the side chains modified to contain both nucleophilic (4-aminopyridine, APy) and hydantoin functionalities with enhanced content of the active bromine. In the 5-(4-hydroxybenzylidene)hydantoin (HBH) moieties, both the amide and imide nitrogens are available for halogen capture, which enhances the active halogens content in the new polymers. Previously, brominated poly(allylamine-co-4-aminopyridine) (PAAm-APy-Br) has been shown to be sporicidal, with up to 8 $\log_{10}$-kills of *B. anthracis* spores at elevated concentrations. The inventors tested the viricidal activity of the APy- and HBH-modified polyamine, both in solution and on nylon-cotton fabric, against human coronavirus (type 229E), which causes mild to moderate upper-respiratory tract illness. The polymers were proven to be effective in coronavirus inactivation, at both low concentrations and short exposure times.

In one aspect, the present invention relates to copolymers containing moieties which are biocidal (e.g., bactericidal, sporicidal, and viricidal). For example, the compositions disclosed herein inactive human respiratory coronavirus. In certain embodiments, the biocidal action of the copolymers disclosed herein is facilitated by the presence of multiple N-halamine groups. N-halamines are moieties in which one or more halogen atoms are bonded to a nitrogen atom via a halamine bond. Said halamine bond, for example, provides stability and facilitates the slow release of halogen species into the environment. In certain embodiments, the N-halamines disclosed herein are halogenated alkylic or aromatic amines or imines. In certain embodiments, the polymers disclosed herein comprise at least one halogenated hydantoin moiety. Hydantoin (i.e., glycolylurea) is a heterocyclic moiety with the formula $CH_2CNHCNH$. In certain embodiments, hydantoins are advantageous because they may comprise multiple active halogen (e.g., chlorine, bromine or iodine) atoms. In certain embodiments, simultaneous presence of primary amine, alkylpyridine and hydantoin moieties as side groups on the polymer backbone enable halogenation of all of the nitrogen containing groups at once, which results in exceptionally high content of active halogens that can be released into a moist or liquid environment, thereby, for example, inactivating inactivate human respiratory coronavirus.

In one aspect, the present disclosure provides copolymers, comprising a plurality of monomers represented by formula I and formula II or salts thereof:

I

II wherein $R^1$, $R^2$, and $R^3$ are each independently hydrogen, alkyl, or halo;

$A^1$ is aryl or heteroaryl; and $m^1$, $m^2$, $m^3$, or $m^4$ are each independently an integer selected from 1-20.

In certain embodiments, $R^1$ is hydrogen.

In certain embodiments, $R^2$ is hydrogen.

In certain embodiments, $R^3$ is hydrogen.

In certain embodiments, $A^1$ is heteroaryl.

In certain embodiments, $A^1$ is pyridyl.

In certain embodiments, $A^1$ is pyridinium bromide.

In certain embodiments, $A^1$ is pyridinium tribromide.

In certain embodiments, $m^1$ is 1.

In certain embodiments, $m^2$ is 1.

In certain embodiments, $m^3$ is 1.

In certain embodiments, $m^4$ is 1.

In certain embodiments, the monomer represented by formula I has a structure represented by formula Ia:

Ia or a salt thereof.

In certain embodiments, the monomer represented by formula II has a structure represented by formula IIa:

IIa or a salt thereof.

In certain embodiments, the monomer represented by formula II has a structure represented by formula IIb:

wherein $X^1$ is halide.

In certain embodiments, $X^1$ is bromide. In certain embodiments, $X^1$ is tribromide.

In certain embodiments, the molar ratio of monomers represented by formula I or formula Ia to monomers represented by formula II, formula IIa, or formula IIb is about 1:1.

In certain embodiments, the copolymer further comprises a plurality of monomers represented by formula III or a salt thereof:

wherein
$X^2$, $X^3$, $X^4$, $X^5$, $X^6$ and $X^7$ are each independently O, S, or $NR^7$;
$A^2$ is aryl or heteroaryl;
$R^4$ and $R^7$ are each independently hydrogen or alkyl;
$R^5$ and $R^6$ are each independently hydrogen, alkyl, or halo; and
$m^5$, $m^6$, and $m^7$ are each independently an integer selected from 1-20.

In certain embodiments, $X^2$ is O.
In certain embodiments, $X^3$ is O.
In certain embodiments, $X^4$ is O.
In certain embodiments, $X^5$ is O.
In certain embodiments, $X^6$ is O.
In certain embodiments, $X^7$ is O.
In certain embodiments, $A^2$ is aryl. In certain embodiments, $A^2$ is phenyl. In certain embodiments, $A^2$ is substituted with a heteroaryl or heterocyclyl.

In certain embodiments, $A^2$ is substituted with a heteroaryl or heterocyclyl comprising a halamine moiety (e.g., N—Cl, N—Br, or N—I). In certain embodiments, $A^2$ is substituted with a heterocyclyl comprising a halamine moiety (e.g., N—Cl, N—Br, or N—I). In certain embodiments, $A^2$ is substituted with a 5-membered heterocyclyl comprising a halamine moiety (e.g., N—Cl, N—Br, or N—I). In certain embodiments, $A^2$ is a heteroaryl or heterocyclyl comprising a halamine moiety (e.g., N—Cl, N—Br, or N—I). In certain embodiments, $A^2$ is a heterocyclyl comprising a halamine moiety (e.g., N—Cl, N—Br, or N—I). In certain embodiments, $A^2$ is a 5-membered heterocyclyl comprising a halamine moiety (e.g., N—Cl, N—Br, or N—I).

In certain embodiments, the monomer represented by formula III has a structure represented by formula IIIa:

or a salt thereof.

In certain embodiments, $R^5$ is hydrogen. In certain embodiments, $R^5$ is bromo.

In certain embodiments, $R^6$ is hydrogen. In certain embodiments, $R^6$ is bromo.

In certain embodiments, $m^5$ is 1.
In certain embodiments, $m^6$ is 1.
In certain embodiments, $m^7$ is 1.

In certain embodiments, the ratio of monomers represented by formula I or Ia to monomers represented by formula II, IIa, or IIb to monomers represented by formula III or Ma is about 4:1:5. In certain embodiments, the ratio of monomers represented by formula I or Ia to monomers represented by formula II, IIIa, or IIb to monomers represented by formula III or Ma is about 41:9:50.

In certain embodiments, the copolymer comprises 2-5,000 repeat units. In certain embodiments, the copolymer comprises 2-2,500 repeat units. In certain embodiments, the copolymer comprises 250-1,500 repeat units. In certain embodiments, the copolymer comprises 500-1500 repeat units.

In certain embodiments, the copolymer is a block copolymer. In certain embodiments, the copolymer is a random copolymer.

In another aspect, the present disclosure provides method of inactivating a pathogen, comprising contacting the pathogen with a copolymer disclosed herein.

In certain embodiments, the pathogen is a bacterium. In certain embodiments, the pathogen is a virus. In certain embodiments, the virus is an adenovirus, an ebolavirus, a coronavirus, an influenza virus, a parainfluenza virus, a parvovirus, a syncytial virus, or a rhinovirus. In certain embodiments, the virus is a coronavirus, an influenza virus, or a rhinovirus. In certain embodiments, the virus is a coronavirus. In certain embodiments, the pathogen is a fungus.

In another aspect, the present disclosure provides fabrics comprising a copolymer disclosed herein.

In certain embodiments, the fabric is a non-woven fabric. In certain embodiments, the fabric further comprises nylon or cotton.

In another aspect, the present disclosure provides devices comprising a copolymer disclosed herein.

In certain embodiments, the device is a medical device.

In another aspect, the present disclosure provides articles of clothing comprising a copolymer disclosed herein.

In certain embodiments, the clothing is protective clothing. In certain embodiments, the clothing is medical protective clothing. In certain embodiments, the article of clothing is a mask, gloves, a gown (e.g., a hospital gown), hospital scrubs, or shoes. In certain embodiments, the clothing is disposable.

In another aspect, the present disclosure provides compositions comprising a copolymer disclosed herein; and an excipient.

In certain embodiments, the excipient is water.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—CH$_2$—O-alkyl, —OP(O)(O-alkyl)$_2$ or —CH$_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_{1-30}$ for straight chains, $C_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$ alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —$OCO_2$—.

The term "carboxy", as used herein, refers to a group represented by the formula —$CO_2H$.

The term "cycloalkyl" includes substituted or unsubstituted non-aromatic single ring structures, preferably 4- to 8-membered rings, more preferably 4- to 6-membered rings. The term "cycloalkyl" also includes polycyclic ring systems having two or more cyclic rings in which two or more carbons are common to two adjoining rings wherein at least one of the rings is cycloalkyl and the substituent (e.g., $R^{100}$) is attached to the cycloalkyl ring, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, pyrimidine, denzodioxane, tetrahydroquinoline, and the like.

The term "ester", as used herein, refers to a group —C(O)$OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO$_3$H, or a pharmaceutically acceptable salt thereof.

The term "sulfonamide" is art-recognized and refers to the group represented by the general formulae wherein $R^9$ and $R^{10}$ independently represents hydrogen or hydrocarbyl.

The term "sulfoxide" is art-recognized and refers to the group —S(O)—.

The term "sulfonate" is art-recognized and refers to the group SO$_3$H, or a pharmaceutically acceptable salt thereof.

The term "sulfone" is art-recognized and refers to the group —S(O)$_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR$^9$ or —SC(O)R$^9$
wherein R$^9$ represents a hydrocarbyl.

The term "thioether", as used herein, is equivalent to an ether, wherein the oxygen is replaced with a sulfur.

The term "urea" is art-recognized and may be represented by the general formula wherein $R^9$ and $R^{10}$ independently represent hydrogen or a hydrocarbyl.

"Salt" is used herein to refer to an acid addition salt or a basic addition salt.

The term "acid addition salt" as used herein means any non-toxic organic or inorganic salt of any base copolymers disclosed herein. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed, and such salts may exist in either a hydrated, solvated or substantially anhydrous form. In general, the acid addition salts of compounds of Formula I are more soluble in water and various hydrophilic organic solvents, and generally demonstrate higher melting points in comparison to their free base forms. The selection of the appropriate salt will be known to one skilled in the art. Other non-pharmaceutically acceptable salts, e.g., oxalates, may be used, for example, in the isolation of compounds of Formula I for laboratory use, or for subsequent conversion to a pharmaceutically acceptable acid addition salt.

The term "basic addition salt" as used herein means any non-toxic organic or inorganic salt of any base copolymers disclosed herein. Illustrative inorganic bases which form suitable salts include lithium, sodium, potassium, calcium, magnesium, or barium hydroxide. Illustrative organic bases which form suitable salts include aliphatic, alicyclic, or aromatic organic amines such as methylamine, trimethylamine and picoline or ammonia. The selection of the appropriate salt will be known to a person skilled in the art.

Many of the copolymers useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain copolymers which contain alkenyl groups may exist as Z (zusammen) or E (entgegen) isomers. In each instance, the disclosure includes both mixture and separate individual isomers.

Some of the copolymers may also exist in tautomeric forms. Such forms, although not explicitly indicated in the formulae described herein, are intended to be included within the scope of the present disclosure.

EXAMPLES

The invention now being generally described, it will be more readily understood by reference to the following examples, which are included merely for purposes of illustration of certain aspects and embodiments of the present invention, and are not intended to limit the invention.

Example 1: Preparation of Exemplary Copolymers

Figure 1:
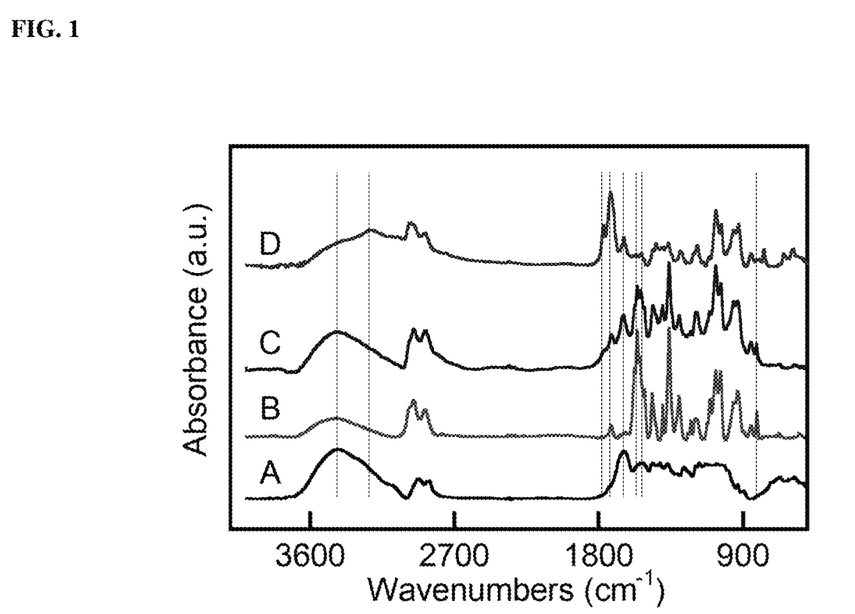
FIG. 1 is a FTIR spectra of nylon-cotton (NYCO) fibrous material (A), NYCO material treated by cyanuric chloride/CLDT blend (B), NYCO fabric treated by grafting of PAAm-APy polymer (C), and NYCO fabric grafted by HBH-PAAm-APy-Br (D). Vertical lines at 3405, 3212, 1770, 1722, 1626, 1595, 1534, and 812 $cm^{-1}$ designate vibrations of the following groups: —OH of cotton in NYCO fabric, —N—H stretch of 4-aminopyridine, brominated amide (1770) and imide (1722) bonds of hydantoin, —N—H absorbance band, and $C_3N3$ triazine ring, respectively.

Synthesis of 5-(4-hydroxybenzylidene)hydantoin (HBH)-Modified Polymers and Materials Blends of p-hydroxybenzaldehyde (6.11 g, 50 mmol), hydantoin (5.50 g, 55 mmol), and 4-methylpiperidine (MPP, 15 mL) were kept at 130° C. for 2 h, followed by dilution with water (300 mL) at r.t., acidification (1 M HCl, 5 mL), filtration of the formed HBH precipitate, washing with chilled water and drying under vacuum [20]. Subsequently, pimelic acid (PMA, 3.36 g, 21 mmol) was activated by addition of 2-chloro-4,6-dimethoxy-1,3,5-triazine (CDMT, 7.0 g, 40 mmol)) in 100 mL of anhydrous THF under nitrogen atmosphere (0.5 h, r.t.). Upon addition of triethylamine (5 mL) to the solution, the resulting triethylamine hydrochloride precipitate was removed by filtering. Then, HBH (4.4 g, 25 mmol) was added and allowed to react with the activated PMA for 5 h at r.t. under stirring. The resulting mixture was used for attachment of the HBH-PMA moieties to the cationic polymers via N-substitution. The attachment was carried out by diluting the HBH-PMA solutions, without product isolation, by an aqueous poly(allylamine-co-4-aminopyridine) (PAAm-APy) solution and 2 w % 4-(4,6-dimethoxy-1,3,5-triazin-2-yl)-4-methylmorpholinium chloride (DMTM), a triazine-based condensing reagent. Synthesis, purification, characterization and subsequent bromination of the PAAm-APy copolymer have been detailed previously [9]. The synthetic route toward brominated N-halamine polymers is depicted in FIG. 1. Main properties of the parent PAAm-APy polymer, its N-halamine derivative (HBH-PAAm-APy) and their brominated derivatives are given in Table 1.

Scheme.1. Schematic of the synthesis of N-halamine polymer (HBH-PAAm-APy) and its bromination.

-continued

HBH-PAAm-APy → Bromination → HBH-PAAm-APy-Br

TABLE 1

Properties of the parent PAAm-APy (Mw 110 kDa by GPC), HBH-PAAm-APy and their brominated derivatives. Unit mol ratio was estimated using $^1$H NMR integrations, and Br content was measured by elemental analysis.

| Polymer | Molar composition | Br content [meq/g] |
|---|---|---|
| PAAm-APy | PAAm:APy = 50:50 | 0 |
| PAAm-APy-Br | PAAm:APy = 50:50 | 4.1 |
| HBH-PAAm-APy | HBH:PAAm:APy = 41:9:50 | 0 |
| HBH-PAAm-APy-Br | HBH:PAAm:APy = 41:9:50 | 6.6 |

Synthesis of Polymer-Modified Fabric and Bromination

Weighed fibrous mats of NYCO (50:50 w/w blend of cotton and nylon-6.6) from a nonwoven, milspec fabric were treated with 1 wt % solution of cyanuric chloride and 0.5 et % CMDT in methyl ethyl ketone, followed by drying under vacuum at r.t. The activated fabrics were then repeatedly sprayed with 5 or 10 wt % aqueous solutions of PAAm-APy or HBH-PAAm-APy following by drying at 60° C. until constant weight, washing by water and lyophilization. The weight gain of the fabric swatches after polymer attachment varied in the 5-10 wt % range. Bromination of the polymer-modified fabric was accomplished by soaking in $Br_2/CCl_4$ solution followed by thorough washing with solvents and water. The washed fabric swatches were dried in a desiccator until constant weight and kept in the dark prior to use. FTIR of the original fabric and HBH-PAAm-APY-Br-modified fabric showed the presence of N-halamine groups on the fabric surface (FIG. 1). The presence of 0.3-0.4 or 0.7-0.9 meq/g bromine on the surface of the fibrous NYCO fabric modified by polymer at 5 or 10 wt % level, respectively, was measured by elemental analysis.

Example 2: Properties of Exemplary Copolymers

Testing of Human Coronavirus Inactivation

Human coronavirus 229E (ATCC® VR-740™) was grown and propagated in human embryonic L-132 cell line (human lung epithelium; ATCC: CCLS). The maintenance medium consisted of minimum essential medium (MEM) without fetal bovine serum containing 100 IU/ml of penicillin and 100 µg/mL of streptomycin. Viruses were purified by centrifugation to remove cell debris followed by PEG precipitation. Virus stock was stored at −80° C. Infectious virus titres were determined as $\log_{10}$ 50% tissue culture infective doses ($TCID_{50}$) in confluent cells in 96-well microtitre plates.

Testing of Polymer Solutions

Coronavirus 229E (1 ml of $10^5$ $TCID_{50}$) was seeded to Erlenmeyer flasks with 50 mL PBS (pH 7.4). Varying amounts of 10 mg/mL PAAm-APy, PAAM-APy-Br, HBH-PAAm-APy, or HBH-PAAm-APy-Br polymer solutions were added into each flask, resulting in effective bromine concentrations ranging from 0 to 5 mg/L. Flasks without polymer served as positive control. The flasks were placed on a 200-rpm rotary shaker at 23° C. and sampled at t=0.5 h by withdrawing 1 mL from each flask and diluting it into 1 mL of Dey-Engley neutralizing broth (Sigma). Flasks containing 10 mg/L HBH-PAAm-APy-Br polymer were sampled at t=1, 5 and 10 min. The samples were frozen in 1.0 ml aliquots at −80° C. The aliquots were subsequently assayed using the $TCID_{50}$ method. All measurements were conducted in triplicate. Inactivation rate (IR, %) was calculated as:

$$IR(\%) = \frac{TCID_{50}^c - TCID_{50}^d}{TCID_{50}^c} \times 100,$$

where $TCID_{50}{}^c$ and $TCID_{50}{}^d$ are the 50% tissue culture infective dose ($TCID_{50}$) values per mL of the control and disinfection group, respectively.

Testing of Modified Fibrous Material

Weighed circular fabric swatches (diameter 5 cm) modified with 5 wt % polymers were sanitized by 70% ethanol, air-dried, and inoculated with 0.1 mL of diluted 229E virus. Control fabric swatches without the polymer added were treated identically. The swatches were incubated at 95% relative humidity and 23° C. At 0.5 h, the surfaces of the swatches were swabbed with nasopharyngeal flocked swabs, which were placed into Dey-Engley neutralizing broth and the resulting samples were diluted, frozen and assayed for $TCID_{50}$ values.

Results and Discussion

The surface of the NYCO non-woven fabric modified by nucleophilic polyamine and N-halamine polymers (PAAm-APy and HBH-PAAm-APy-Br) via triazine attachment steps possessed a multitude of aromatic amine- and N-halamine groups (FIG. 3). The N-halamine polymer described herein possesses two —NH groups per hydantoin unit, as well as a secondary amine and an aromatic amine per 4-aminopyridine unit accessible for bromination and subsequent exchange of the bromine with the environment. Results of the testing of the presented polymers and polymer-modified NYCO fabric are summarized in Tables 2-4.

TABLE 2

Inactivation rate (%) of human coronavirus 229E by polymeric additives in solution. Time of inactivation, 30 min.

| Polymer additive | Polymer concentration [mg/L] | Effective bromine concentration [mg/L] | $TCID_{50}{}^d$ | Inactivation rate [%] |
|---|---|---|---|---|
| Control | 0 | 0 | 0 | 0 |
| PAAm-APy | 10 | 0 | 5.06 ± 0.41 | 11.2 |
| PAAm-APy-Br | 5 | 1.6 | ≤1.97 ± 0 | ≥65.4 |
| PAAm-APy-Br | 10 | 3.2 | <LoD* | 100 |
| HBH-PAAm-APy | 10 | 0 | 5.35 ± 0.44 | 6.1 |
| HBH-PAAm-APy-Br | 1 | 0.5 | ≤1.48 ± 0.11 | ≥74.1 |
| HBH-PAAm-APy-Br | 5 | 2.4 | ≤1.25 ± 0 | ≥78.1 |
| HBH-PAAm-APy-Br | 10 | 4.8 | <LoD | 100 |

*LoD: limits of detection for the virus range from 40 to 100,000 copies/mL.

TABLE 3

Inactivation rate (%) of human coronavirus 229E by HBH-PAAm-APy-Br (10 mg/L) in solution as a function of time.

| Time (min) | $TCID_{50}{}^d$ | Inactivation rate [%] |
|---|---|---|
| 1 | 3.66 ± 0.30 | 25.8 |
| 5 | 2.26 ± 0.21 | 60.2 |
| 10 | ≤LoD | 100 |

TABLE 4

Inactivation rate (%) of human coronavirus 229E by NYCO fabric modified by polymers (5 mg/g fabric). Time of inactivation, 10 min.

| Polymer | $TCID_{50}{}^d$ | Inactivation rate [%] |
|---|---|---|
| Control fabric | 5.46 ± 0.21 | ≤4.2 |
| PAAm-APy | 5.13 ± 0.39 | 10.5 |
| PAAm-APy-Br | <LoD | 100 |
| HBH-PAAm-APy | 4.94 ± 0.21 | 13.4 |
| HBH-PAAm-APy-Br | <LoD | 100 |

Brominated multifunctional amines modified by APy and HBH groups facilely inactivated type 229E coronavirus at low concentrations of <5-10 mg/L, both in solution and while attached to the NYCO non-woven fabric. The polymers had an active bromine load up to 40 wt %, which is 2-fold higher than the 18-19% in brominated 5,5'-dimethylhydantoin polystyrene beads, specifically designed for efficient microbial inactivation and water purification.

Figure 2:
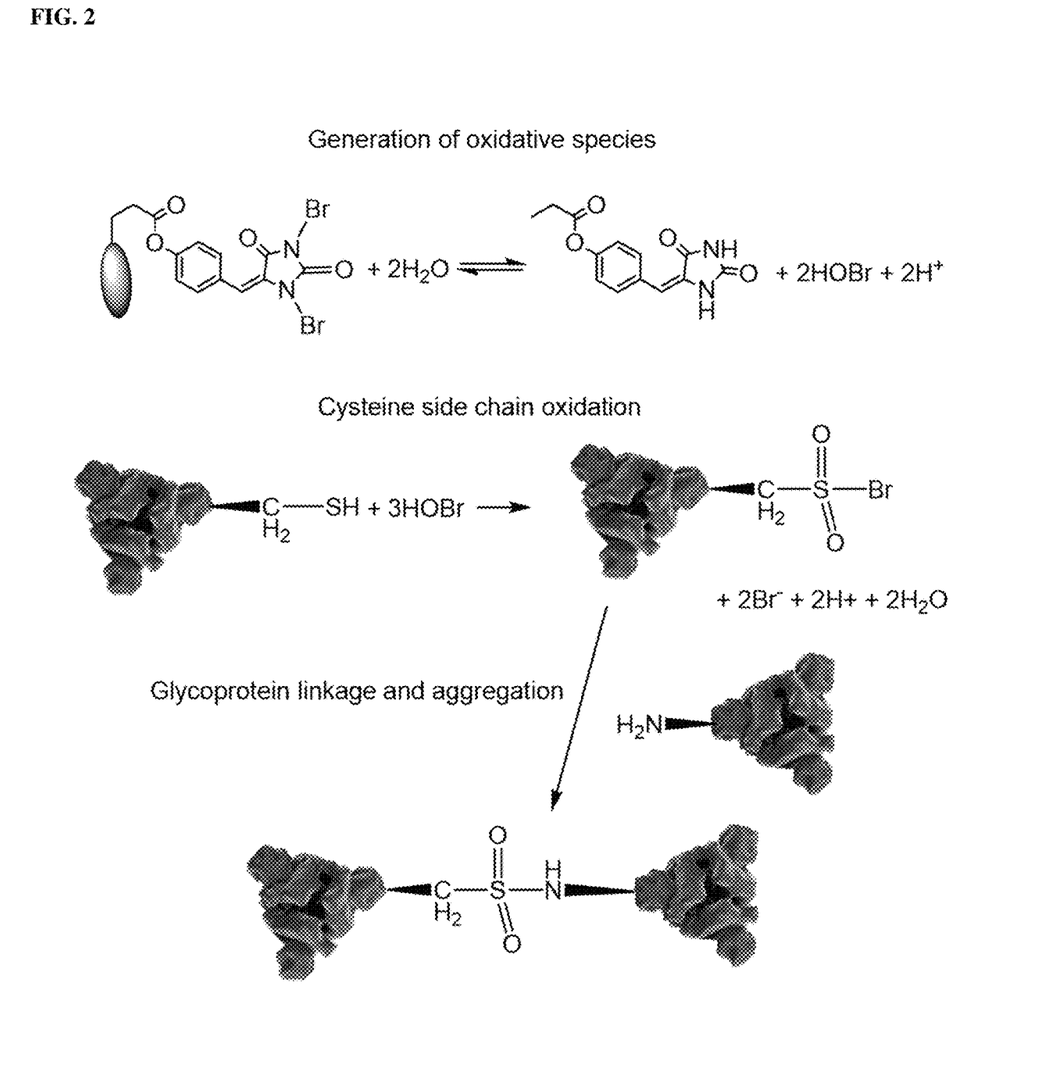
FIG. 2 is a schematic of coronavirus inactivation by polymeric N-halamine via the chemical modification of the cysteine side chains of the S-protein.

Coronaviruses are positive-stranded RNA viruses with an envelope containing glycoprotein spikes. Generation of the highly oxidative hypobromous acid from the polymeric N-halamine results in the oxidation of the cysteine side-chains of the coronavirus's proteins generating reactive sulfonyl bromide side chains, which, in turn, bind to the amine side chains of the neighboring protein molecules, resulting in protein linking and aggregation. The presence of the Cys motifs in the CoV spike and envelope proteins has been documented. The (glyco)protein aggregation can be among the leading mechanisms of the coronavirus inactivation (FIG. 2).

To summarize, advances in the development of broad-range viricidal and antimicrobial polymers, offer the possibility of customizing a wide range of paints and coatings for engineered surfaces, including on fabrics, protective equipment and medical devices. The inventors approach toward enhancing decontaminating properties of polyamines by their modification with supernucleophilic groups has been further augmented by the development of dually-active polymers also containing oxidizing N-halamine groups. The developed polymers are shown to be highly reactive and possess a broad-range biocidal activity, including for human coronavirus inactivation and sporicidal activity.

INCORPORATION BY REFERENCE

All publications and patents mentioned herein are hereby incorporated by reference in their entirety as if each indi- vidual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A copolymer, comprising a plurality of monomers represented by formula I and formula II or salts thereof:

wherein
$R^1$, $R^2$, and $R^3$ are each independently hydrogen, alkyl, or halo;
$A^1$ is aryl or heteroaryl;
$m^1$, $m^2$, $m^3$, or $m^4$ are each independently an integer from 1-20; and
the copolymer comprises 2-5,000 repeat units.

2. The copolymer of claim 1, wherein $R^1$, $R^2$ and $R^3$ are each hydrogen.

3. The copolymer of claim 1, wherein $A^1$ is heteroaryl.

4. The copolymer of claim 1, wherein $A^1$ is pyridinium bromide or pyridinium tribromide.

5. The copolymer of claim 1, wherein $m^1$, $m^2$, $m^3$, and $m^4$ are each 1.

6. The copolymer of claim 1, wherein the monomer represented by formula II has a structure represented by formula IIb:

wherein $X^1$ is halide.

7. The copolymer of claim 6, wherein $X^1$ is bromide or tribromide.

8. The copolymer of claim 1, wherein the molar ratio of monomers represented by formula I to monomers represented by formula II is about 1:1.

9. The copolymer of claim 1, further comprising a plurality of monomers represented by formula III or a salt thereof:

wherein
$X^2$, $X^3$, $X^4$, $X^5$, $X^6$ and $X^7$ are each independently O, S, or $NR^7$;
$A^2$ is aryl or heteroaryl;
$R^4$ and $R^7$ are each independently hydrogen or alkyl;
$R^5$ and $R^6$ are each independently hydrogen, alkyl, or halo; and
$m^5$, $m^6$, and $m^7$ are each independently an integer from 1-20.

10. The copolymer of claim 9, wherein $X^2$, $X^3$, $X^4$, $X^5$, $X^6$ and $X^7$ are each O.

11. The copolymer of claim 9, wherein $A^2$ is substituted with a heterocyclyl comprising a halamine moiety.

12. The copolymer of claim 9, wherein the monomer represented by formula III has a structure represented by formula IIIa:

or a salt thereof.

13. The copolymer of claim 9, wherein $R^5$ is bromo.

14. The copolymer of claim 1, wherein $R^6$ is bromo.

15. The copolymer of claim 9, wherein $m^5$ and $m^6$ are each 1.

16. The copolymer of claim 9, wherein $m^7$ is 5.

17. A method of inactivating a pathogen, comprising contacting the pathogen with the copolymer of claim 1.

18. A device, comprising the copolymer of claim 1.

19. An article of clothing, comprising the copolymer of claim 1.

20. The copolymer of claim 1, wherein the monomer represented by formula I has a structure represented by formula Ia:

Ia or a salt thereof; and i) the monomer represented by formula II has a structure represented by formula IIa:

IIa or a salt thereof; or ii) the monomer represented by formula II has a structure represented by formula IIb:

IIb wherein
$X^1$ is halo.

* * * * *